United States Patent [19]

Powers

[11] Patent Number: 4,611,225

[45] Date of Patent: Sep. 9, 1986

[54] PROGRESSIVE SCAN HDTV SYSTEM

[75] Inventor: Kerns H. Powers, Princeton, N.J.

[73] Assignee: RCA Corporation, Princeton, N.J.

[21] Appl. No.: 701,608

[22] Filed: Feb. 14, 1985

[51] Int. Cl.<sup>4</sup> ............................................. H04N 7/01
[52] U.S. Cl. .................... 358/140; 358/150
[58] Field of Search .................. 358/140, 150, 148, 11, 358/12, 311, 138, 214

[56] References Cited

U.S. PATENT DOCUMENTS 3,617,626 11/1971 Bluth et al. ...................... 358/311
4,275,422 6/1981 LeCouteur ...................... 358/140 X

OTHER PUBLICATIONS

"R&D on High-Definition Television in Japan", Hayashi, pp. 178-186; Society of Motion Picture & T.V. Engineers, Jul. 1980.
S. Kiver, "Color Television Fundamentals", McGraw-Hill, 1964, pp. 37-39.
"A Proposed Strawman HDTV Origination Standard," W. Fagot, K. Powers contribution to ATSC Technology Group on HDTV, Oct. 15, 1984.

*Primary Examiner*—Howard W. Britton
*Assistant Examiner*—Victor R. Kostak
*Attorney, Agent, or Firm*—P. J. Rasmussen; P. M. Emanuel; R. G. Coalter

[57] ABSTRACT

A timing signal generator applies timing signals to a wide aspect ratio (1.77:1) imager in a non-interlaced HDTV system for causing the imager video output signal to exhibit a line rate of 45,000 Hz and a field rate of 60 Hz such that at each step in post production conversion of the video signal to a lower definition distribution standard the conversion equipment operates in a line locked mode thereby ensuring that fractional pixels are not produced during the conversion steps and greatly simplifying the timing of such functions as line-rate, frame-rate and aspect-ratio conversions.

7 Claims, 5 Drawing Figures

| POINT | SAMPLE RATE MHZ | LINE RATE KHZ | FRAME RATE HZ | TOTAL HORIZ. SAMPLES | ACTIVE HORIZ. SAMPLES | LINES PER VERT. SCAN | ACTIVE LINES PER FRAME |
|---|---|---|---|---|---|---|---|
| 14 | 72 | 45 | 60 | 1600 | 1280 | 750 | 726 |
| A | 54 | 45 | 60 | 1200 | 960 | 750 | 726 |
| B | 40.5 | 45 | 60 | 900 | 720 | 750 | 726 |
| C | 27 | 30 | 60 | 900 | 720 | 500 | 484 |
| D | 13.5 | 15.734 | 29.97 (2:1) | 858 | 720 | 262.5 | 484 |
| E | 33.75 | 37.5 | 50 | 900 | 720 | 750 | 726 |
| F | 27 | 30 | 50 | 900 | 720 | 600 | 576 |
| G | 13.5 | 15.625 | 25 (2:1) | 864 | 720 | 312.5 | 576 |

Fig. 5

| POINT | SAMPLE RATE MHZ | LINE RATE KHZ | FRAME RATE HZ | TOTAL HORIZ. SAMPLES | ACTIVE HORIZ. SAMPLES | LINES PER VERT. SCAN | ACTIVE LINES PER FRAME |
|---|---|---|---|---|---|---|---|
| 14 | 72 | 45 | 60 | 1600 | 1280 | 750 | 726 |
| A | 54 | 45 | 60 | 1200 | 960 | 750 | 726 |
| B | 40.5 | 45 | 60 | 900 | 720 | 750 | 726 |
| C | 27 | 30 | 60 | 900 | 720 | 500 | 484 |
| D | 13.5 | 15.734 | 29.97 (2:1) | 858 | 720 | 262.5 | 484 |
| E | 33.75 | 37.5 | 50 | 900 | 720 | 750 | 726 |
| F | 27 | 30 | 50 | 900 | 720 | 600 | 576 |
| G | 13.5 | 15.625 | 25 (2:1) | 864 | 720 | 312.5 | 576 |

PROGRESSIVE SCAN HDTV SYSTEM

FIELD OF THE INVENTION

This invention relates to high definition television (HDTV) production systems and particularly to video cameras for use in such systems.

BACKGROUND OF THE INVENTION

Video production systems employing an interlaced scanning format have been proposed, one example being an 1125 line, 30 frames/second 2:1 interlaced system developed by the Japan Broadcasting Company, NHK. Interlace advantageously provides an increase in the large-area flicker frequency at no increase in bandwidth but at the cost of well known interlace "artifacts" which are particularly troublesome where moving images are concerned.

High definition production systems employing a progressive (non-interlaced) format have been proposed which avoid the problems of motion characteristic of interlaced systems and use to advantage the progressive scan characteristic of "pixel adjacency". In a progressive-scan system, vertically adjacent pixels are nearly simultaneous in time hence frames can be processed as complete pictures providing advantages in nearly all post-production processes (e.g., image manipulation and special effects, aperature correction and MTF enhancement, spatial filtering, editing, slow-motion, standards conversion, etc.).

A number of scanning formats have been proposed for use in progressively scanned HDTV production systems. For example, a 1575 line, 24 frame per second, non-interlaced, variable aspect ratio (1.33:1 to 2.35:1) system is described by Bluth et al. in U.S. Pat. No. 3,617,626 entitled "High-Definition Color Picture Editing and Recording System". Such a low frame rate may be expected to provide poor temporal resolution. Non-interlaced systems having higher frame rates (and lower line rates) have been suggested. As an example, the signal parameters of an 800 line per field, 60 field per second system are described in "A Proposed 'Strawman' HDTV Origination Standard" by W. Fagot and K. Powers in a contribution to the ATSC Technology Group on HDTV dated Oct. 15, 1984. The "picture structure" of the proposed standard is as follows: 800 lines, 726 active lines, 60 FPS, 1:1 interlace, 5.33:3 (i.e., 1.77:1) aspect ratio and a luminance bandwidth of 29 MHz. The proposed digital encoding standard comprises: 72 MHz sampling rate (luma), 1500 samples per line and 1290 samples per active line.

The foregoing 800/60/1:1 system has many advantages in a production system. Motion artifacts are eliminated by the progressive (non-interlaced) scanning. The temporal resolution is superior to the interlaced 1125 line NHK system and the spatial resolution is also subjectively superior taking into account the loss of resolution due to the so-called "interlace factor" (i.e., the multiplier that must be applied to the number of lines in an interlaced system in addition to the Kell factor in determining the effective resolution of an interlaced system). The interlace factor is, typically, in the range of 0.6 to 0.65 which indicates that the subjective sharpness of the 1125/30/2:1 system is roughly equivalent to that of a progressively scanned system with 35-40 percent fewer lines.

SUMMARY OF THE INVENTION

In accordance with a first aspect of the invention, it is herein recognized that a need exists for further improvement in HDTV production systems, particularly with regard to the aspect of conversion to release media (e.g., conversion to 525/30/2:1 or 625/25/2:1 distribution standards or to film) and to meeting the requirements of the digital studio signal standards of CCIR Recommendation 601). There are a number of parameters of an HDTV signal which must be altered when the signal is "down-converted" to a lower definition standard. Typically, one or more of the following processes may be involved: aspect ratio conversion, frame rate conversion, line rate conversion, sample rate conversion, anti-alias filtering, etc. The present invention is specifically directed to meeting the need for a HDTV production system having the property of permitting post-production processing on an orthogonal grid of samples at each step in the conversion from the HDTV standard to a lower definition distribution standard.

A HDTV production system embodying the invention comprises an imaging means having an output for providing a video output signal representative of a raster scanned image and input means for receiving vertical and horizontal scanning signals for controlling the field rate and the line rate, respectively of the raster scanned image. A timing signal generator means, coupled to the input means of the imaging means, supplies a vertical timing signal thereto having a frequency of 60 Hz and supplies a horizontal timing signal thereto having a frequency of 45,000 Hz whereby the video output signal exhibits field and line rates of 60 Hz and 45,000 Hz, respectively, in non-interlaced form.

BRIEF DESCRIPTION OF THE DRAWING

The foregoing and further features of the invention are illustrated in the accompanying drawing wherein like elements are denoted by like reference designators and in which:

FIG. 5 is a table of signal parameters associated with the system of FIG. 4.

DETAILED DESCRIPTION

Figure 1:
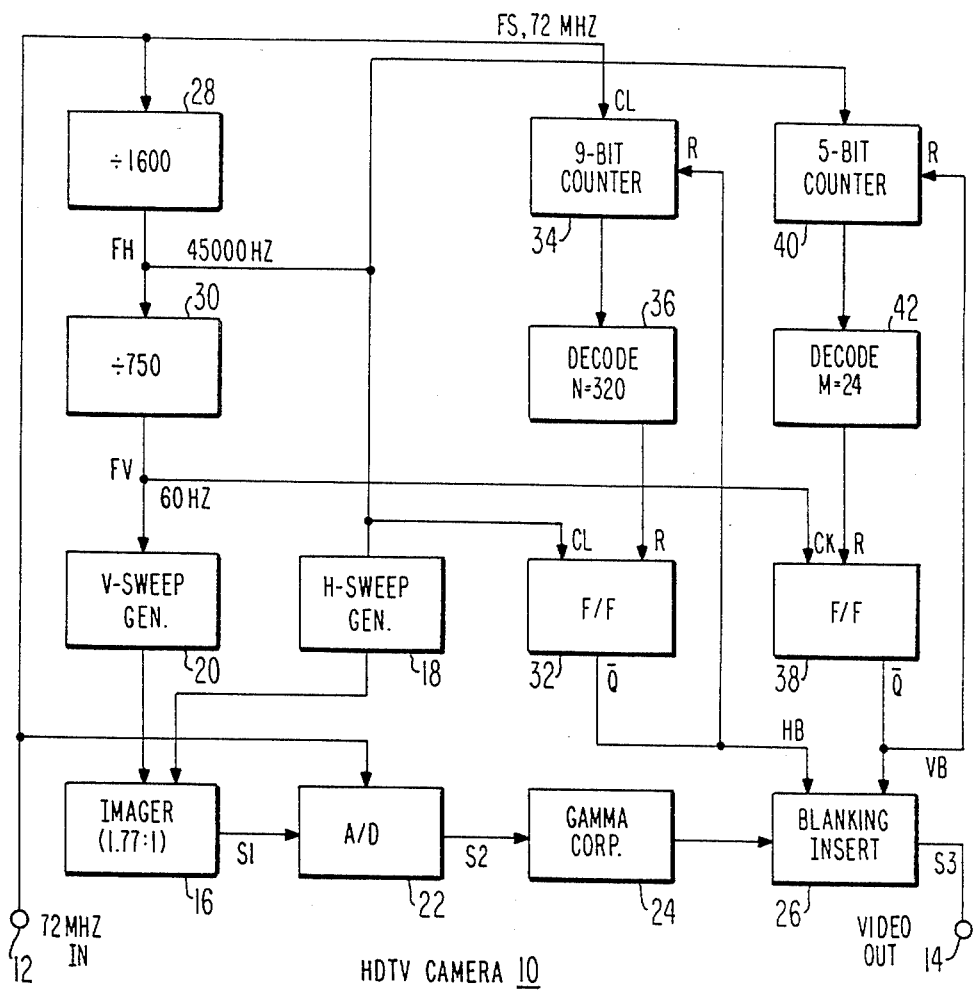
FIG. 1 is a block diagram of a HDTV camera embodying the invention.

The HDTV camera 10 of FIG. 1 has scanning parameters selected so as to (1) eliminate motion artifacts, (2) to provide high spatial-temporal resolution and (3) to facilitate subsequent conversion to lower definition distribution standards. It is an important feature of the invention that the specific line and field scanning parameters have the unique property of facilitating "line-locking" at each stage in post-production processing when converting to lower definition distribution signal formats (e.g., 525/30 or 625/25 standards) so as to enable processing on an orthogonal grid of samples at each stage of the down-conversion process. This feature of the invention is discussed subsequently in detail in connection with the system of FIG. 4.

Camera 10 includes an input terminal 12 for receiving a clock or sampling signal FS having a frequency of 72

Figure 2:
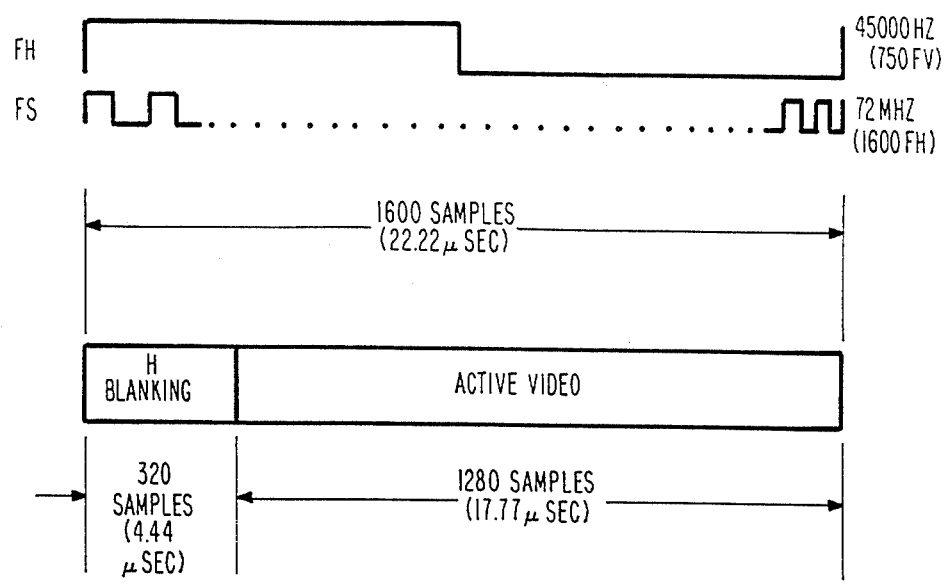
FIG. 2 is a diagram illustrating the line scanning format of the camera of FIG. 1.
Figure 3:
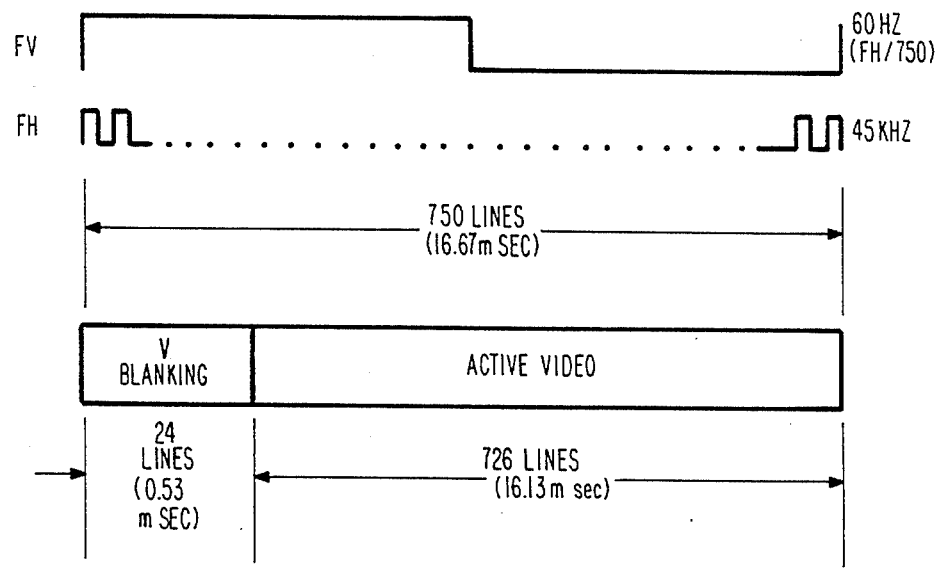
FIG. 3 is a diagram illustrating the field scanning format of the camera of FIG. 1.

MHz and an output terminal 14 for for providing a video output signal having the line and field formats shown in FIGS. 2 and 3, respectively. The line format comprises a line scan rate, FH, of 45,000 Hz which corresponds to 750 times the field rate of 60 Hz or to 1/1600 of the clock or "sampling" signal FS (72 MHz). The sampling frequency of 72 MHz is selected for compatibility with 525/30 and 625/25 digital studio standards and is a multiple of 2.25 MHz to provide an integral number of horizontal samples in a line for both formats. It also is selected to exceed the Nyquist rate for the luminance signal bandwidth (e.g., 29 MHz) and is an even multiple of 9 MHz to avoid creating harmonics at the international distress frequencies of 121.5 and 243 MHz. Of importance to post production signal conversion, the 72 MHz sampling frequency provides, as shown, 1600 samples per line of which 320 are allocated to horizontal blanking and 1280 are allocated to active video.

The vertical scanning format (FIG. 3) comprises a field rate of 60 Hz which equals the line rate (45,000 Hz) divided by the integer 750. This relationship ensures that the output signal format will comprise 750 lines per frame and will be non-interlaced since there are an even number of lines per field. Twenty-four lines are allocated to vertical blanking and 726 lines are provided for so-called "active video". The value of 726 active lines is particularly attractive as it is a factor of 3/2 of 484 making conversions to 525/30 interlaced formats simple and with elimination of three lines at the top and bottom of an active field the resultant 720 active line frame may be reduced by the factor of 4/5 to provide 576 active lines in 625/25 interlaced format systems. Other features and advantages of the scanning formats of FIGS. 2 and 3 of the camera 10 of FIG. 1 are discussed subsequently in connection with the system of FIG. 4.

Considering now the details of camera 10, the camera includes an imager 16 (which may be, for example, of the diode-gun saticon type) having an aspect ratio of 1.77:1 and having inputs for receiving horizontal and vertical sweep signals provided by generators 18 and 20, respectively, and an output coupled to output terminal 14 via a cascade connection of an analog to digital (A/D) converter 22, a gamma correction unit 24 and a blanking insertion unit 26. A divider 28 divides the 72 MHz sample signal FS by 1600 to provide a horizontal line-rate signal FH of 45,000 Hz which is applied to generator 18 for causing the output signal (S1) to have a line rate of exactly 45,000 Hz. The field (or frame) rate of imager 16 is obtained by means of a further divider 30 which divides signal FH by 750 to produce a 60 Hz signal FV for triggering (synchronizing) the vertical sweep generator 20.

Signal S1 is sampled and converted to digital form by means of converter 22 which receives the 72 MHz signal FS from terminal 12 thereby providing a processed output signal S2 in digital form having 1600 samples per line as shown in FIG. 2. Signal S2 is applied via gamma correction unit 24 to blanking insertion unit 26 which inserts horizontal blanking (HB) and vertical blanking (VB) signals of 320 samples and 24 lines, respectively, whereby the HDTV output signal (S3) at terminal 14 conforms in terms of blanking, line rate and field rate to the format shown in FIGS. 2 and 3.

The horizontal blanking signal HB of 320 samples duration is produced by a flip-flop 32 which is set by the rising edge of the line rate signal FH whereby the complemented flip-flop output goes low at the beginning of each line. The flip flop is reset at the end of the horizontal blanking period by means of a counter 34 which begins counting the 72 MHz sample pulses when flip-flop 32 is set and supplies a reset signal to flip-flop 32 by means of a decoder 36 when the count, N, equals 320. A similar arrangement of a flip-flop 38, a (5 bit) counter 40 and a decoder (M=24) generates the vertical blanking signal VB by counting line pulses (FH) subsequent to each vertical sweep pulse (FV) thereby blanking the first 24 lines per field of the video output signal S3.

Figure 4:
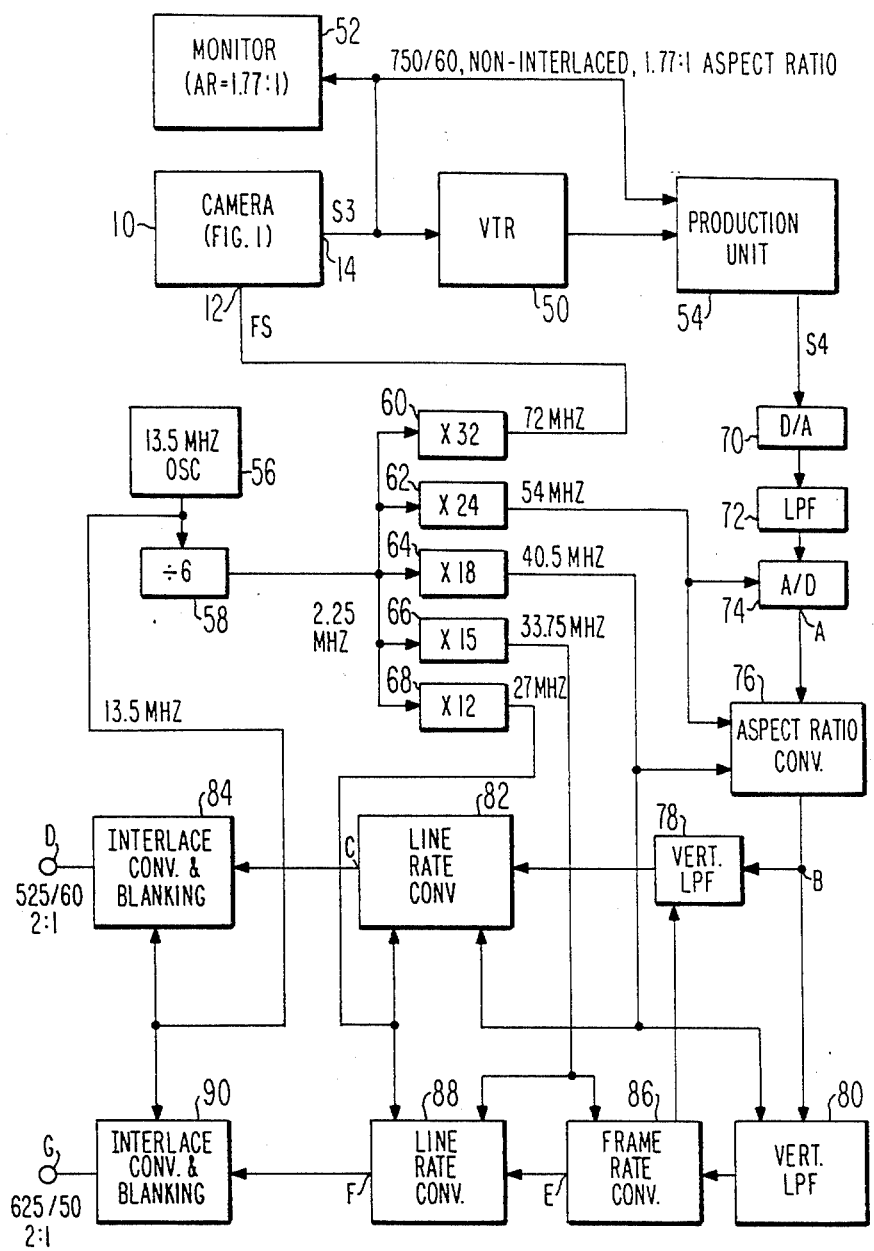
FIG. 4 is a block diagram of a HDTV production system employing the camera of FIG. 1.

Certain features of the HDTV video signal format provided by camera 10 may be more fully appreciated by considering the production system of FIG. 4. As will be discussed, all conversion frequencies in the system including the camera sampling frequency are integer multiples of 2.25 MHz and thus are line locked to the three line frequencies (45 KHz, 15.625 KHz and 15.734266 KHz). This unique property is a direct result of the selected scanning parameters and provides the benefit, previously mentioned, of enabling processing on an orthogonal grid of samples at every step in the conversion process to lower definition 525 and 625 interlaced standards. Stated another way, this feature of the invention ensures that no fractional pixels are produced during the conversion steps thereby greatly simplifying the timing of such functions as line rate, frame rate and aspect ratio conversions, filtering, etc.

In the system, the output signal provided by camera 10 is applied to a monitor 52, to a video tape recorder (VTR) 50 and to a production unit 54 which provides conventional production functions such as video switching, editing, special effects and so fourth. The output signal S4 of unit 54 is of the same HDTV format as video signal S3. The remainder of the system comprises various units for converting signal S4 to lower definition standards (e.g., 525/60/2:1 and 625/50/2:1).

Timing signals for camera 10 and the conversion units are generated by means of a 13.5 MHz oscillator 56 having an output coupled via a divide-by-six frequency divider 58 to the inputs of five frequency multipliers 60, 62, 64, 66 and 68 which multiply the 2.25 MHz signal of divider 58 by integer factors of 32, 24, 18, 15 and 12, respectively, thereby providing conversion frequencies of 72 MHz, 54 MHz, 40.5 Mhz, 33.75 Mhz and 27 MHz. These frequencies, as well as the 13.5 MHz signal provided by oscillator 56 are all integer multiples of each of the three line frequencies concerned, namely, the 45000 Hz line frequency of camera 10, the 15,625 Hz line frequency of the 625/50/2:1 output format and the 15,734.266 Hz line rate of the 525/60/2:1 standard. Consequently, all conversions involve whole pixels with no need to compensate (retime) fractional pixels as would otherwise be the case in HDTV systems not having the format of signal S3.

The first step in the conversion process comprises reducing the horizontal resolution of signal S4 by the factor ¾ which corresponds to a conversion of from 1280 active samples per line to 960 active samples per line. This function is provided by the cascade connection of D/A converter 70, low pass filter 72 and A/D converter 74. The function of converter 70 and filter 72 is to prevent aliasing when converter 74 resamples signal S4 at a sampling frequency of 54 MHz. For this purpose the filter cut-off frequency may be on the order of 22 MHz. The 54 MHz sampling frequency for converter 74 equals ¾ of the original sampling rate (72 MHz) and thus the number of active pixels at point A (the converter 74 output) has been reduced by ¾ from 1280 to 960. For ease of understanding, FIG. 5 provides a table listing of the signal parameters at various points in the system of FIG. 4.

The next step in the conversion process involves reducing the aspect ratio of the signal at point A (1.77:1) to a value of 1.33:1 conforming the 525 and 625 broadcast standards. This is provided by an aspect ratio converter 76 which, illustratively, may comprise a read/write memory and an address controller. The video signal is stored in the memory at the 54 MHz clock rate and recovered at the 40.5 MHz rate. On readout, address locations corresponding to 120 samples on each end of an active line are skipped and blanking is similarly reduced (by 60 samples) so that at point B the signal comprises 900 samples of which 720 are active video in 1.33:1 aspect ratio.

After aspect ratio conversion the video signal (point B) is applied to a pair of vertical low pass filters 78 and 80 which provide anti-alias filtering functions for subsequent converters. Filter 78 in the 525 standard signal path has a response cut-off of 194 CPH (cycles per picture height) which correspond to a reduction factor of about ⅔. Filter 80 in the 625 standard signal processing path has a response of 232 CPH for a reduction factor of about 4/5. In the 525 standard signal path the output of filter 78 is applied to a line rate converter 82 and thence to an interlace converter and blanking insertion unit 84. Converter 82 (e.g., a line interpolator) provides a ⅔ reduction in line rate in proportion to the ratio of the clock signals (27 and 40.5 MHz) supplied thereto. Unit 84 provides the final conversion step to 525 line standards by deleting 42 samples in the horizontal blanking interval, dropping one field per thousand (to provide 60 to 59.94 field rate conversion) and adding 25 lines per frame in the vertical blanking interval to bring the total to 41 (20 and 21 lines in alternate fields). Similar processing is performed in the 625 standard signal path by frame rate converter 86, line rate converter 88 and interlace converter and blanking inserter 90 to form the 625/50/2:1 standard signal. The frame rate and line rate conversion factors are 5/6 and 4/5, respectively, as determined by the frequencies of the clock signals supplied to the converters.

What is claimed is:

1. A HDTV system, comprising:
    imaging means having an output for providing a video output signal respresentative of a raster scanned image and input means for receiving vertical and horizontal scanning signals for controlling the field rate and the line rate, respectively, of said raster scanned image; and
    timing signal generator means, coupled to said input means of said imaging means, for supplying a vertical timing signal thereto having a frequency of 60 Hz and for supplying a horizontal timing signal thereto having a frequency of 45,000 Hz for causing said video output signal to exhibit field and line rates of 60 Hz and 45,000 Hz, respectively, in non-interlaced form.

2. A HDTV system as recited in claim 1 further comprising means for sampling said video output signal at a sample rate of 72 MHz to form a sampled video signal having 1600 samples per line.

3. A HDTV system as recited in claim 2 further comprising means for blanking 320 of said 1600 samples per line.

4. A HDTV system as recited in claim 1 wherein said imaging means has an aspect ratio of substantially 1.77:1.

5. A HDTV system as recited in claim 1 further comprising standards conversion means for converting said video output signal to a given video distribution standard and including at least an aspect ratio conversion means and a line rate conversion means and means for supplying plural clock signals thereto, each clock signal being an integer multiple of 2.25 MHz.

6. A HDTV system as recited in claim 1 further comprising means for blanking 24 lines per frame of said video output signal and for not blanking the remaining lines thereby causing said video output signal to exhibit 726 active lines per frame.

7. A HDTV system comprising:
    imaging means having an output for providing a video output signal representative of a non-interlaced raster scanned image and input means for receiving vertical and horizontal scanning signals for controlling the field rate and the line rate, respectively, of said raster scanned image; and
    timing signal generator means, coupled to said input means of said imaging means, for supplying a vertical timing signal thereto having a frequency of 60 Hz and for supplying a horizontal timing signal thereto having a given frequency equal to 2.25 MHz divided by an integer less than 143.

* * * * *